Aug. 2, 1932.        H. T. KRAFT        1,869,816
STEERING WHEEL
Filed Feb. 21, 1930        2 Sheets-Sheet 1

INVENTOR
Herman T. Kraft
BY
Evans & McCoy
ATTORNEYS

Aug. 2, 1932.  H. T. KRAFT  1,869,816
STEERING WHEEL
Filed Feb. 21, 1930   2 Sheets-Sheet 2

INVENTOR
Herman T. Kraft
BY
Evans & McCoy
ATTORNEYS

Patented Aug. 2, 1932

1,869,816

UNITED STATES PATENT OFFICE

HERMAN T. KRAFT, OF AKRON, OHIO, ASSIGNOR TO THE H. A. HUSTED COMPANY, OF DETROIT, MICHIGAN, A CORPORATION OF MICHIGAN

STEERING WHEEL

Application filed February 21, 1930. Serial No. 430,196.

This invention relates to steering wheels and particularly to a composition wheel having an embedded reinforcing spider.

One of the objects of the present invention is to provide a steering wheel having an improved hub construction which is simple in construction and can be easily and economically manufactured.

Another object is to provide a reinforced steering wheel having an improved hub construction wherein a separately formed hub member is secured to the reinforcing spider without the use of bolts, rivets, welding or other conventional securing means.

Another object is to provide a reinforcing steering wheel of new and improved construction wherein a separately formed hub member is secured to the reinforcing member of the wheel and wherein the hub member is embedded in the material of the wheel.

A further object is to provide a reinforced composition steering wheel having a hub member embedded in the wheel material, whereby the conventional counterbore is eliminated.

These being among the objects of the present invention, the same may be said to comprise the apparatus as illustrated in the accompanying drawings to be hereinafter described and particularly set forth in the appended claims, together with such variations and modifications thereof as will be apparent to one skilled in the art to which this invention appertains.

In the drawings which illustrate a suitable embodiment of the present invention, Figure 1 is a plan view of a reinforced composition steering wheel, portions of the composition material being broken away to clearly show the reinforcing member.

Figure 1:
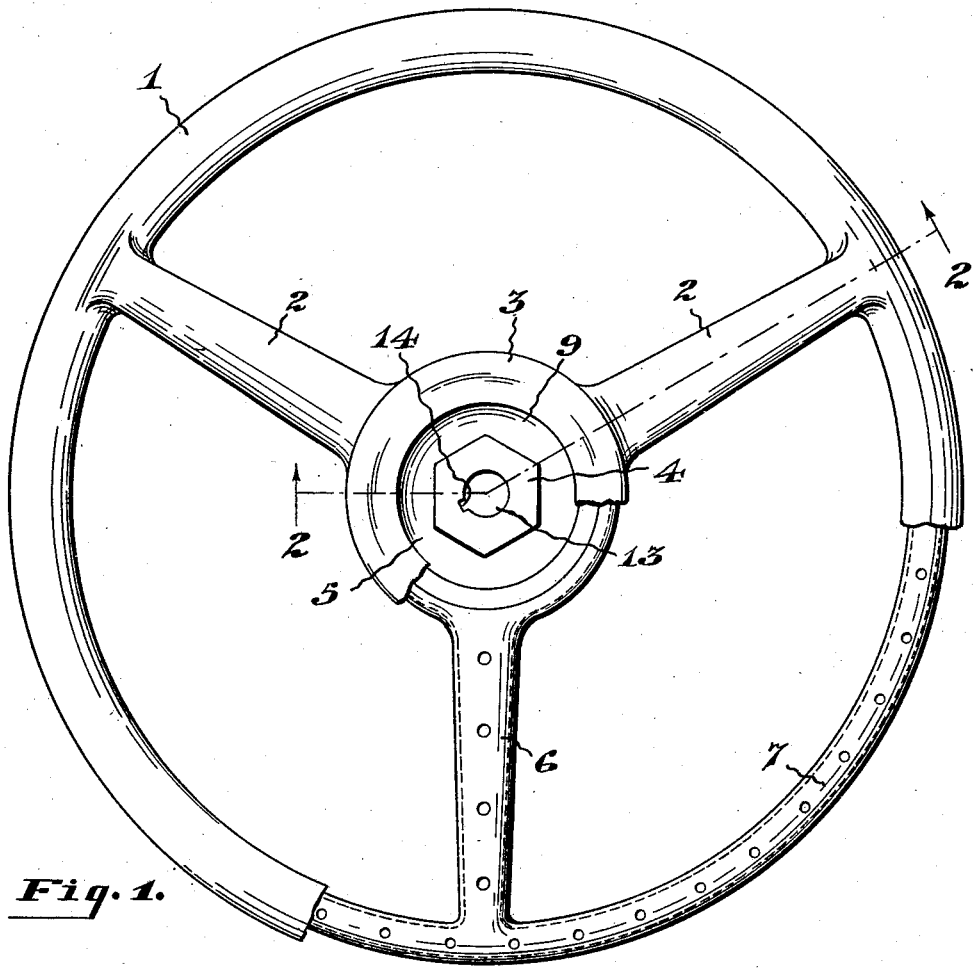

Considerable difficulty has been encountered heretofore in manufacturing a low-priced steering wheel having the characteristics of the higher priced wheels. Heretofore it has been difficult to provide a suitable hub construction which could be economically produced and still have the required strength.

The present invention contemplates a very simple construction wherein the hub can be produced at a relatively low cost and can be easily secured to the wheel without the use of the conventional securing means such as bolts, welding, etc.

Referring to the accompanying drawings in which like numerals refer to like parts throughout the several views, the steering wheel of the present invention comprises a rim 1, spokes 2, and hub 3 of suitable composition material having an embedded reinforcing spider, preferably formed of a single piece of sheet metal, although it may comprise separate metallic members suitably secured together, and a separately formed hub member 4 secured to the hub annulus 5 of the reinforcing spider. As shown in the drawings, the spokes 6 and rim 7 of the reinforcing spider are embedded in the corresponding spokes 2 and rim of the wheel 1, and the composition material forming the hub 3 is preferably extended axially to completely surround the hub member 4 and a cup-shaped member 8 of sufficient size to receive the steering column housing of a motor vehicle when the wheel is assembled to the vehicle.

The hub 3 of the wheel is preferably formed with a relatively large central opening 9 coaxial with the hub 4, which is of sufficient depth to form a housing for such items of vehicle control, as horn, gas, spark and light control mechanism.

Figure 2:
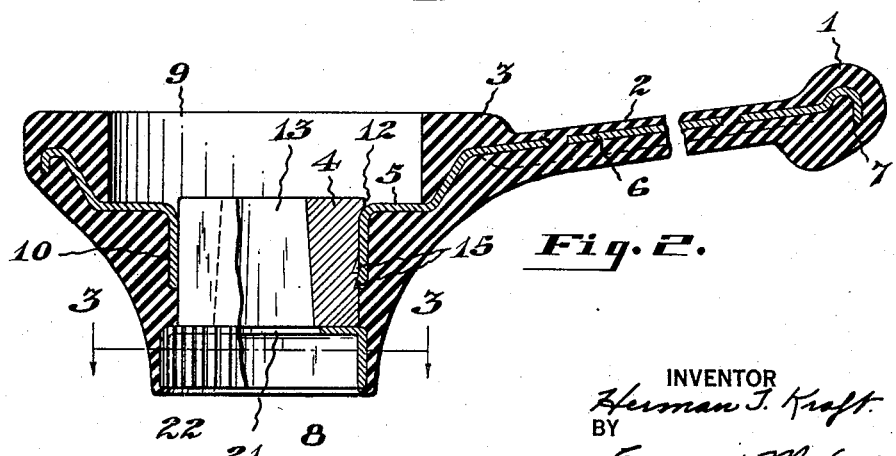
Fig. 2 is an enlarged transverse section of the wheel taken substantially on the line 2—2 of Fig. 1.
Figure 3:
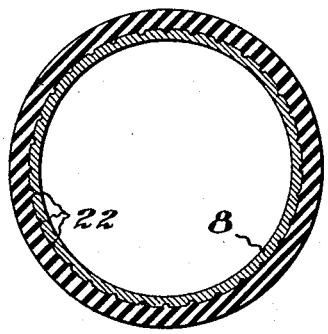
Fig. 3 is an enlarged section of the wheel taken on the line 3—3 of Fig. 2, showing the means for holding the cup-shaped hub stamping in position.

The hub annulus 5 of the reinforcing spider is preferably dished or cup-shaped, as shown in Fig. 2, and is formed with an axial depending flange 10 which defines the central opening thereof, and is preferably formed to a hexagonal shape to correspond with the shape of the separately formed hub 4. The shape of the continuous flange 10, however, is dependent upon the cross-sectional shape of the hub 4.

Figure 5:
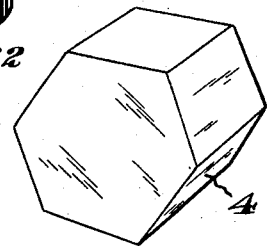
Fig. 5 is a perspective view of a piece of bar stock from which the separate formed hub is constructed.
Figure 6:
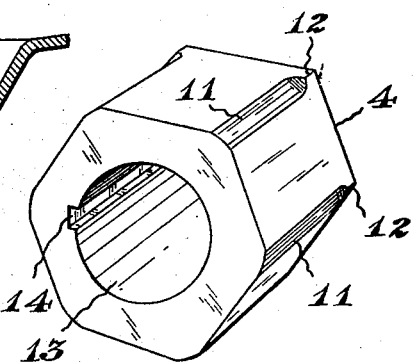
Fig. 6 is a perspective view of the stock illustrated in Fig. 5, showing the partially finished hub.
Figure 7:
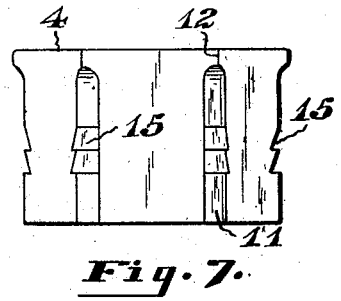
Fig. 7 is an elevation of the completed hub showing a number of recesses formed therein.

The separately formed hub 4 is, as shown in Figs. 5, 6 and 7, of such design that it can be quickly and economically machined from a piece of bar stock and further that the same can be quickly formed in an automatic screw machine of the type wherein bar stock is fed thereto and all the operations are performed on the article before it is discharged. It is obvious that by performing all the machining operations in a single machine that considerable time can be saved in the manufacture of the hub members.

The hub 4 is preferably of hexagonal shape, although, if desired, it may be of octagonal, square, or any other suitable shape. During the process of forming the hub 4 the corners of the intersecting side faces are turned down, as shown in Figs. 6 and 7, to provide curved portions 11 which extend longitudinally and terminate near the upper end thereof, so that in effect, projecting portions 12 are formed at the upper ends of the intersecting faces, which overlie the rounded faces 11. The hub 4, while the rounded faces 11 are being formed, is also provided with a tapered central opening 13. The central opening 13, as shown in the drawings, is formed with a suitable keyway 14, which when the steering wheel is assembled to the steering shaft of a vehicle, receives a key to prevent rotation of the wheel relative to the steering shaft.

The rounded portions 11 of the hub 4 are, as shown in Figs. 2 and 7, formed with transversely extending angular grooves 15, the grooves of each face portion 11 being in circumferential alignment with the grooves in the other face portions. These grooves 15, as will be later described, assist materially in uniting the hub 4 to the hub annulus 5 of the sheet metal reinforcing spider.

The hub 4 and flange 10 are preferably of such size as to provide a relatively snug sliding fit so that the hub can be easily positioned within the flange 10.

Figure 8:
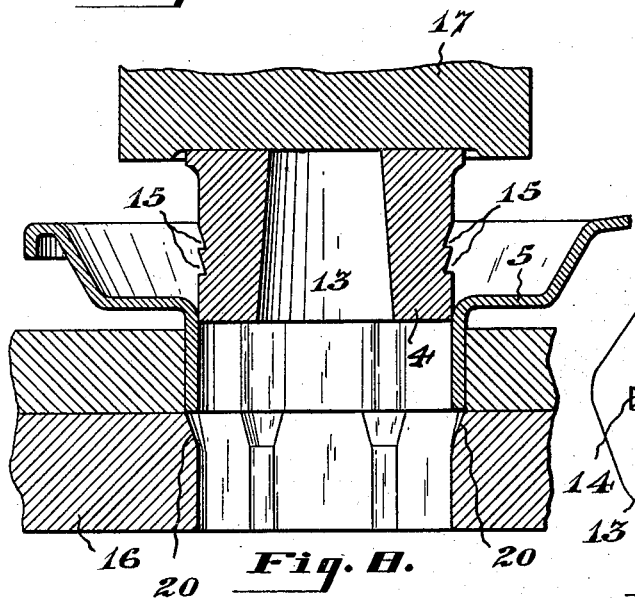
Fig. 8 is a sectional view of the hub portion of the reinforcing member showing the hub in the act of being assembled thereto.

In assembling the hub 4 to the reinforcing spider, the hub is telescoped with the continuous flange 10 of the annulus 5, and the spider and hub are then positioned in a suitable assembling die, as shown in Fig. 8, comprising a die portion 16 and a punch portion 17. The die portion 16 is formed with a stepped opening, the lower portion 18 of which is substantially the same size as the hub 4, and the upper portion of which is substantially the same size as the hub annulus flange 10, so that the hub and flange are substantially held against lateral movement with respect to the die 16. The metal of the die 16 lying between the lower and upper portions 18 and 19 is inclined upwardly to provide inclined shoulders 20 at the intersecting corners and at a point adjacent to the grooves 15 of the hub, when the hub and spider are supported in the assembling die. As shown in Fig. 8, the lower edge of the flange 10 abuts against the upper portion of the inclined shoulders 20 of the die, and the lower face of the hub annulus is spaced slightly above the surface of the die 16.

Figure 9:
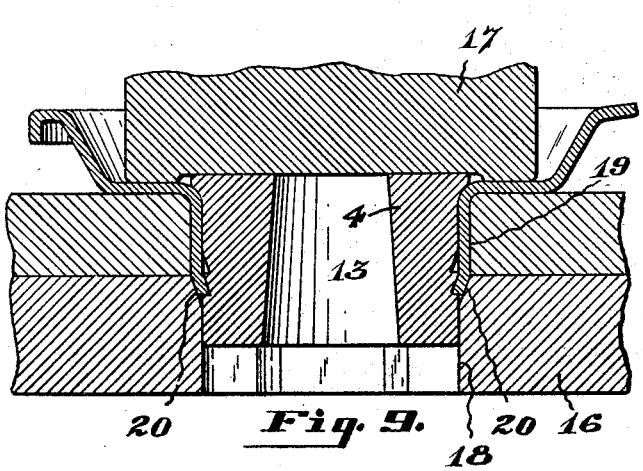
Fig. 9 is a view similar to Fig. 8 showing the hub just after it has been completely assembled to the reinforcing spider, and before it has been removed from the assembling dies.

As the punch 17 is driven downwardly against the top of the hub 4, the spider is also driven downwardly against the top of the die and the overlying hub portions 12 are pressed very firmly against the surface of the hub annulus 5, which portions 12 serve to axially align the hub 4 and spider. The hub 4, in fact, is driven against the hub annulus 5 with such force that the overlying corners 12 are to some extent forced thereinto. During the downward movement of the spider and hub, the corners of the intersecting faces of the flange 10 which rest on the inclined shoulders 20 of the die, are driven into the grooves 15 of the hub 4 because of such inclined shoulders 20. These corner portions of the flange 10 substantially fill the grooves 15 and very effectively lock the hub 4 and spider against relative axial movement, as shown in Fig. 9.

The hubs 4 may be formed with any number of grooves 15, as shown in Fig. 7, and may be of the sawtooth shape as shown or of any other suitable shape.

A single design of hub may be employed for different sized spiders, and the same may be formed with a number of the grooves 15 so that the same may be used with spiders having hub flanges of different lengths. It can be seen that by providing a hub of the construction described, it is not necessary to design a different hub for each type of spider, with the result that a material saving in manufacturing costs is effected.

Figure 4:
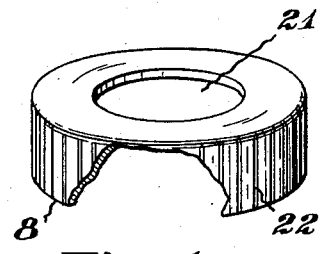
Fig. 4 is an enlarged broken perspective view of the cup-shaped hub stamping.

A very material saving in the cost of the hub material is effected by eliminating the conventional counterbore and providing the wheel with the construction of the present invention. This is accomplished by providing the cup-shaped member 8 shown in Figs. 2 and 4, which can be formed by stamping the same from a piece of scrap sheet metal. The cup-shaped member 8 is of sufficient diameter to receive the steering shaft housing of the vehicle to which the wheel is to be assembled, and is formed with a central opening 21 of the same or slightly larger diameter than the maximum diameter of the hub opening 13. The member 8 is further formed with a number of grooves 22 on its outer surface which may extend axially as shown in Fig. 4, or may extend circumferentially around the same.

The cup-shaped member 8 is seated in the bottom of the mold cavity in which the wheel is formed, and the spider is then positioned in the mold with the hub firmly seated in axial alignment on the member 8. The composition body is then molded around the spider, hub, and cup-shaped member 8 in the desired manner, so that such composition embeds the spider and associated parts as shown in Figs. 1 and 2.

The grooves 22 serve to firmly unite the composition body to the cup-shaped member 8 and hold the member 8 in the correct position. However, if desired, the cup-shaped member 8 may be welded or otherwise secured to the hub member 4.

It is to be particularly noted that the composition body is so molded about the spider as to provide the recess 9 for the reception of conventional vehicle control mechanism.

It is to be further noted that the hub described, while being very rigid and strong, is of simple and economical construction.

It is clearly obvious that the invention described provides a very effective means of securing the hub member to the spider hub annulus and that a very economical and rigid construction is produced which materially reduces the cost of manufacturing and assembling of steering wheels of the type described.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a composition steering wheel having a central axial hub portion, a metallic hub member embedded in said axial portion and having an axial bore therein for the reception of a steering post, and a cup-shaped member of greater diameter than said bore for the reception of a steering post housing abutting against an end of said hub member and being embedded in said axial hub portion in axial alignment with said hub member.

2. In a composition steering wheel having a central axial hub portion, a metallic hub member and a cup-shaped member abutting against but secured to said hub member, the composition material comprising said axial hub portion being molded around the axial external surfaces of said hub member and cup-shaped member, and the external axial surface of said cup-shaped member being formed with ribs to lock with said composition material.

3. In a composition steering wheel having a central axial hub portion, a metallic hub member embedded in said hub portion and having an axial bore therein for the reception of a steering post, and an annular collar of greater internal diameter than said bore also embedded in said hub portion in axial alignment with said hub member for the reception of a steering post housing, said collar having an inwardly extending radial flange seating against said hub member.

4. In a composition steering wheel having an axial hub portion of composition material, a metallic hub member embedded in said hub portion and having an axial bore therein for receiving a steering post, and a thin-walled cup-shaped member of an internal diameter greater than said bore for receiving a steering post housing and having a radially inwardly extending flange abutting the end of said hub member in nonsecured relation, said cup-shaped member also being embedded in said hub portion coaxial with said hub member, the composition material of said hub portion providing the sole means for holding said cup-shaped member in aligned relation with said hub member.

In testimony whereof I affix my signature.

HERMAN T. KRAFT.